July 16, 1940.                W. S. STEELE                2,207,992
                           COMBUSTION CHAMBER
                          Filed June 26, 1937

Inventor
William S. Steele
By: Roland C. Rehm
Atty.

Patented July 16, 1940

2,207,992

UNITED STATES PATENT OFFICE 2,207,992

COMBUSTION CHAMBER

William Sinton Steele, Long Island City, N. Y., assignor to T. E. Schundler & Co., Inc., Joliet, Ill., a corporation of Illinois Application June 26, 1937, Serial No. 150,442

4 Claims. (Cl. 110—86)

This invention relates to combustion chambers, and among other objects aims to provide an efficient combustion chamber assembly, particularly adapted for use with oil, gas and other burners.

The nature of the invention may be readily understood by reference to one illustrative construction embodying the invention and shown in the accompanying drawing.

Figure 1:
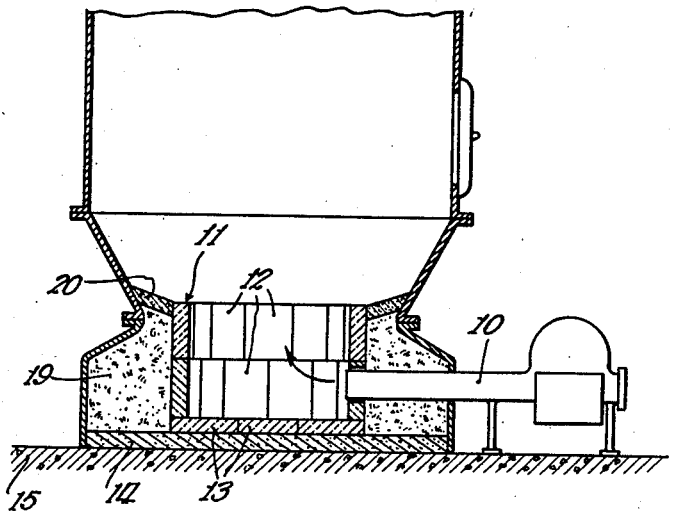
Fig. 1 is a vertical section of a combustion chamber and associated elements assembled in a conventional furnace.

The invention is here shown embodied in a combustion chamber assembly for an oil burner of the gun type, wherein the air and fuel mixture is introduced through the tube 10. The high temperatures developed in service of this character require that the chamber lining be highly refractory, and because the burner generally operates intermittently, the lining must have a low specific heat so that the heat from the burner will be rendered effective as soon as possible after it starts in operation.

The foregoing qualities characterize the illustrative lining 11 comprising exfoliated vermiculite bonded together in brick form or other molded shapes. Exfoliated vermiculite is an alteration product of certain micaceous minerals such as biotite, which exfoliate or expand to many times their original size upon the application of heat to produce a lightweight granular mineral which possesses a high insulating and acoustical efficiency and is highly refractory. Efficiently expanded exfoliated vermiculite weighs as little as 4 lbs. per cu. ft. It has a very low heat storage capacity and unlike most insulating materials, retains its insulating efficiency at high temperatures where a large proportion of heat energy is in the form of radiant heat. The numerous highly polished laminae which characterize exfoliated vermiculite act efficiently (by reflection and otherwise) to resist transmission of radiant heat at temperatures where many other low temperature insulating materials become heat conductors instead of insulators.

The exfoliated vermiculite is advantageously bonded together by binding materials which provide successively maturing ceramic bonds. This avoids the expense of firing the brick to as high temperatures as would be necessary if but a single bonding material of such high fusibility as to render it capable of withstanding maximum service conditions, were used. By varying the amounts of low and high maturing clay binders, it is possible to develop a ceramic bond by firing at relatively low temperatures (i. e. 1600–1800° F.) during which firing practically all of the shrinkage of the brick is removed. If in service exceptionally high temperatures be encountered, the higher maturing bond will develop but with little or no attendant shrinkage. In addition to the very substantial pre-firing costs involved, the brick or other shapes are almost certain to collapse in the kiln if only a single bonding material of high fusibility be used. Any air setting or mechanical bonding material used in forming the brick or other shapes would have been destroyed long before the aforesaid ceramic bond developed.

One illustrative combination of bonding materials (for 16 parts by volume of exfoliated vermiculite) comprises:

| | Parts by volume |
|---|---|
| Fire clay | 3 |
| Kaolin type clay | 2 |
| High alumina (calcium aluminate) cement | 3 |

The high alumina cement is essentially a calcium aluminate which forms when wet with water an initial binder. In addition it is capable of withstanding temperatures of about 1400° F. and functions to bond the materials together in the kiln until the low maturing fire clay bond develops. This occurs between 1400 and 1800° F. and the shrinkage of the brick is therefore practically eliminated before it is placed in service.

The kaolin type clay while not converted to a ceramic bond at the time the brick or other shapes are installed for use, nevertheless functions to extend very materially the useful range of the product. The latter clay and also the residue of the decomposed high alumina ("luminite") cement start to develop a ceramic bond at about 2000° F. when the bond formed by the low maturing clay begins to soften.

It should be understood that various clays and varying proportions of low and high maturing clays may be employed, and that such proportions may vary depending on the character of the aggregate used. Those given above are appropriate for aggregates having the fusion and fluxing properties of exfoliated vermiculite.

To the entire mix, 15% of ganister is advantageously added to reduce both air and firing shrinkage. One form of ganister comprises crushed calcined fire brick.

Figure 3:
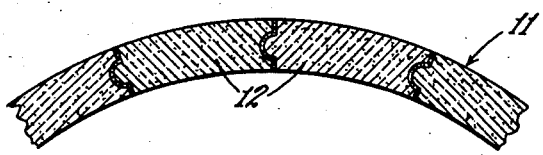
Fig. 3 is a horizontal section on an enlarged scale of a portion of the combustion chamber shown in Fig. 1, illustrating details in one form of lining brick.

The shape and dimensions of the combustion chamber may be varied to suit requirements. Chambers of circular or elliptical shape may advantageously be made from curved brick 12 (Fig. 3) formed with a ball and socket at their respective ends to provide a tight joint in various angular positions of the brick. The combustion chamber illustrated in Figs. 1 and 3 is of circular section having an inside diameter of about 20 inches. For most designs, two rows of brick, each 7 inches in height, will provide a combustion chamber of the desired depth. The brick may advantageously be about 2 inches in thickness and 6 inches in length. It will be understood that the brick dimensions are largely determined by convenience and the particular design of combustion chamber. The dimensions given are merely illustrative. The bottom of the chamber is lined by flat brick 13 placed on a cushion 14 of cement which serves to absorb sound and prevent transmission of vibrations to the concrete sub-floor 15, as a leveling medium, and as protection for the sub-floor. One form of cushion cement may comprise finely divided exfoliated vermiculite bonded together by a highly plastic clay having a low fusion point which develops a ceramic bond at temperatures of about 1600° F. The joints between the bottom and side brick are preferably cemented together with plastic fire cement. In some designs the bottom brick may be molded integral with the side brick.

Figure 2:
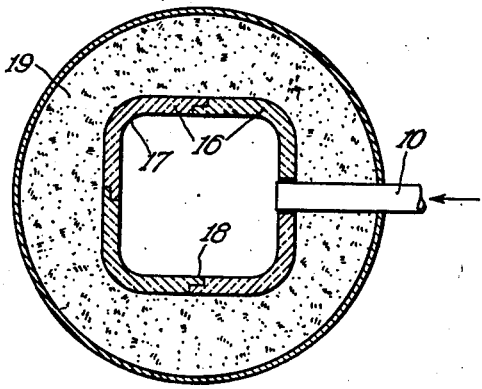
Fig. 2 is a horizontal section of a combustion chamber of generally rectangular shape.

For rectangular and square combustion chambers, brick 16 of the shape illustrated in Fig. 2 may be advantageously employed. These are provided with relatively large curves 17 at the corners and are offset as at 18 at their ends to provide a ship-lap joint. Flat brick located between the angular brick may be used if necessary to increase the dimension and proportion of the combustion chamber. The bricks are of such character that they may be cut with wood-working tools if slight alterations be necessary.

The space behind and around the chamber is advantageously filled with a loose fill 19 of granules of exfoliated vermiculite. A light layer of plastic insulating cement 20 is advantageously placed on the loose vermiculite fill to prevent its being carried away by the whirling gases. Cement having the composition of the above cushion cement may advantageously be used. The fill serves not only to prevent heat loss through the furnace walls but to reduce noise by absorbing sound vibrations in the combustion chamber.

The materials necessary for assembling the combustion unit may be advantageously packaged for shipment in a container wherein the vermiculite filling material surrounds and protects the brick elements.

Obviously the invention is not limited to the details of the illustrative construction since these may be variously modified. Moreover, it is not indispensable that all features of the invention be used conjointly, since various features may be used to advantage in different combinations and sub-combinations.

Having described my invention, I claim:

1. In a furnace, the combination comprising an intermittently operating burner, a combustion chamber against which impinge the burning gases issuing from said burner, said chamber being lined with brick formed mainly of granules of exfoliated vermiculite to give the chamber lining low heat absorption and low heat conductivity whereby the inner surface of the chamber may be quickly brought up to heat by the burning gases to secure efficient combustion.

2. In a furnace or the like, the combination comprising a plurality of refractory brick units formed mainly of exfoliated vermiculite to give the brick a low heat absorption and low heat conductivity, said brick being assembled to form a combustion chamber for oil or gas fuel, a loose fill of granules of exfoliated vermiculite in the furnace and surrounding said combustion chamber extending substantially to the top of said brick units to provide sound and heat insulation having a very low heat absorption, and a layer of cement on said fill to prevent displacement of the granules under the action of the currents of burning gases.

3. In a furnace or the like, the combination comprising a plurality of refractory brick units formed mainly of exfoliated vermiculite having a low heat absorption and low heat conductivity, said units being arranged to form a combustion chamber for oil or gas fuel, and a loose fill of granules of exfoliated vermiculite in the furnace and surrounding said combustion chamber to resist transmission of radiant heat and to absorb sound vibrations.

4. In a furnace or the like, the combination comprising a plurality of refractory brick units formed mainly of exfoliated vermiculite to give the brick a low heat absorption and low heat conductivity, said brick being assembled to form the sides and bottom of a combustion chamber for oil or gas fuel, a sound and heat insulating fill of exfoliated vermiculite around the sides of said chamber, and a layer of cushion cement containing exfoliated vermiculite underneath and supporting the bottom of said chamber to deaden sound and vibration.

WILLIAM SINTON STEELE.

---

CERTIFICATE OF CORRECTION.

Patent No. 2,207,992.                      July 16, 1940.

WILLIAM SINTON STEELE.

It is hereby certified that the name of the assignee in the above numbered patent was erroneously described and specified as "T. E. Schundler & Co., Inc." whereas said name should have been described and specified as --F. E. Schundler & Co., Inc., of Joliet, Illinois, a corporation of Illinois--, as shown by the record of assignments in this office; and that the said Letters Patent should be read with this correction therein that the same may conform to the record of the case in the Patent Office.

Signed and sealed this 27th day of August, A. D. 1940.

Henry Van Arsdale,

CERTIFICATE OF CORRECTION.

Patent No. 2,207,992. July 16, 1940.

WILLIAM SINTON STEELE.

It is hereby certified that the name of the assignee in the above numbered patent was erroneously described and specified as "T. E. Schundler & Co., Inc." whereas said name should have been described and specified as --F. E. Schundler & Co., Inc., of Joliet, Illinois, a corporation of Illinois--, as shown by the record of assignments in this office; and that the said Letters Patent should be read with this correction therein that the same may conform to the record of the case in the Patent Office.

Signed and sealed this 27th day of August, A. D. 1940.

(Seal)

Henry Van Arsdale,
Acting Commissioner of Patents.